United States Patent
Wiebe, Jr.

[11] Patent Number: 5,928,690
[45] Date of Patent: Jul. 27, 1999

[54] PROCESS FOR PREPARING SHAPED MEAT PRODUCTS

[75] Inventor: William R. Wiebe, Jr., Rogers, Ark.

[73] Assignee: Hudson Foods, Inc., Springdale, Ark.

[21] Appl. No.: 08/959,485

[22] Filed: Oct. 28, 1997

[51] Int. Cl.$^6$ .............................. A23L 1/314; A23L 1/317
[52] U.S. Cl. ........................... 426/59; 426/513; 426/574; 426/646; 426/800
[58] Field of Search ................................ 426/56, 59, 513, 426/574, 641, 646, 800, 92

[56] References Cited

U.S. PATENT DOCUMENTS

| | | | |
|---|---|---|---|
| 2,963,376 | 12/1960 | Hogan et al. | 426/59 |
| 3,100,152 | 8/1963 | Williams | 426/59 X |
| 3,188,213 | 6/1965 | Delaney | 426/56 |
| 3,615,693 | 10/1971 | Billerbeck, Jr. et al. | |
| 4,001,441 | 1/1977 | Liepa | 426/104 |
| 4,539,210 | 9/1985 | O'Connell | 426/56 |
| 4,544,560 | 10/1985 | O'Connell | 426/104 |
| 4,603,054 | 7/1986 | Schmidt et al. | 426/574 |
| 4,940,590 | 7/1990 | Williams et al. | 426/92 |
| 5,322,705 | 6/1994 | Heeps | 426/646 |
| 5,368,878 | 11/1994 | Smick et al. | 426/646 |
| 5,384,150 | 1/1995 | Heeps | 426/646 |
| 5,468,510 | 11/1995 | Christensen et al. | 426/646 X |
| 5,518,742 | 5/1996 | Soeda et al. | 426/63 |
| 5,693,350 | 12/1997 | Fernandez et al. | 426/59 X |

*Primary Examiner*—Arthur L. Corbin
*Attorney, Agent, or Firm*—Fellers, Snider, Blankenship, Bailey & Tippens

[57] ABSTRACT

The use of proteolytic enzymes and heat gelling gums or sodium alginate and/or starches to manufacture pureed meat and/or poultry products from raw meat and/or poultry. The proteolytic enzyme is used to digest the meat and/or poultry proteins upon heating. This gives the cooked product its desired pureed texture. The heat gelling gum or sodium alginate and/or starch is added to the product formulation to bind the digested proteins into the appropriate shape and/or to tie up water.

27 Claims, No Drawings

PROCESS FOR PREPARING SHAPED MEAT PRODUCTS

BACKGROUND OF THE INVENTION

The present invention relates to processes for the manufacture of pureed meat products from raw meat that resemble their non-pureed counterparts.

The use of pureed foods in health care facilities is common for patients with dysphagia, or difficulty in swallowing, and those with chewing impairments. Originally, meat would be precooked and then added to a food processor with the appropriate amount of liquid. The mixture would then be processed into a puree and served as such. This is a time consuming process that does not provide a very appetizing looking product for the patient. The unappetizing look of the product could result in reduced food consumption and malnutrition.

An instant food thickener consisting of modified food starch and maltodextrin has been developed and marketed by Diamond Crystal Specialty Foods to health care facilities. The thickener and liquid are blended to make a slurry. The meat is precooked and pureed in a food processor, and the starch slurry is then added to the food processor and chopped until smooth. The pureed product is then shaped by using a scoop or decorating bag and pipe.

Culinary Puree has developed food forming molds of various shapes and sizes to improve the eye appeal of pureed products. The molds are filled with pureed food and frozen. The molded pureed product is ejected from the form onto a plate or pan and then brought to room temperature or heated as desired.

Heeps, U.S. Pat. Nos. 5,322,705 and 5,384,150, developed a process for making a cooked pureed food product which resembles the non-pureed version. These patents disclose the manufacture of a cooked pureed product that starts with ground or chopped precooked meat or other food products. The precooked food is mixed with one or two modified food starches. Liquid and fat are added to the mixture and mixed thoroughly. The resulting mixture is stuffed into a casing or mold and frozen. The frozen product is cut into the desired serving size.

SUMMARY OF THE INVENTION

In contrast to the prior art, the present invention allows for the production of pureed products starting with raw rather than cooked meat. The invention also allows for the manufacture of raw, partially cooked or fully cooked products. In addition the invention allows partially or fully cooked product to be distributed and sold in a refrigerated rather than a frozen state without losing its shape or form. Finally, since salt or phosphates are not necessary for the practice of the invention, it provides an acceptable product for those on a restricted sodium diet.

The present invention relates to a method for manufacturing a pureed meat product from raw meat. The method consists of using proteolytic enzymes to digest the meat proteins upon heating. This gives the cooked product its desired pureed texture. A heat gelling gum, sodium alginate and/or starch is added to the product formulation to bind the digested proteins into the appropriate shape and/or to tie up water.

It is therefore an object of the present invention to provide for the production of pureed products starting with raw rather than cooked meat.

It is a further object of the present invention to provide for the manufacture of raw, partially cooked or fully cooked products.

It is also an object of the present invention to provide for partially or fully cooked product to be distributed and sold in a refrigerated rather than a frozen state without losing its shape or form.

It is a still further object of the present invention to provide for an acceptable product for those on a restricted sodium diet.

These and other objects and advantages of the present invention will be apparent from a consideration of the following detailed description of the preferred embodiments.

DETAILED DESCRIPTION OF THE PREFERRED EMBODIMENTS

The term "meat" referred to herein includes, but is not limited to, beef, pork, and poultry, which further includes, but is not limited to, chicken and turkey.

Initially, it is desirable that the raw (fresh frozen or frozen/tempered) meat be ground or chopped, although the present invention may be practiced with whole muscle product.

The next step desirably involves the manufacture of a marinade consisting of water or broth, heat gelling gum or sodium alginate and/or modified food starch, a proteolytic enzyme and, optionally, a seasoning or flavoring. However, the same results can be accomplished adding the ingredients individually instead of as a marinade. The invention will work with or without the use of salt or phosphate. Furthermore, the present invention will work with or without the addition of water.

The proteolytic enzymes that may be employed in this invention include, but are not limited to, papain, bromelain and ficin. The enzymes may be used singly or in combination. The enzymes are employed in amounts sufficient to yield a pureed meat texture after digestion is completed. Preferably, the concentration of proteolytic enzyme employed to achieve the desired pureed texture ranges from 0.01 to 0.10%. The concentration of the enzyme may need to be greater or less depending on the enzyme source, meat or poultry source, size of meat or poultry source and time in the optimum temperature range for the enzyme.

Whether a heat gelling gum or sodium alginate, modified food starch or combination of these is used is dictated by the enzyme source and level of added water or broth in the formulation.

The heat gelling gums employed in this invention include, but are not limited to, methylcellulose, hydroxypropylcellulose and methylhydroxypropylcellulose. Preferably, the concentration of these gums employed to bind the meat or poultry and water ranges from 0.01% to 0.15%. The amount necessary is determined by the enzyme source and level of added water in the formulation.

The use of sodium alginate requires a calcium source such as calcium sulfate to form a gel. A calcium sequestrant such as tetrasodium phosphate may be desirable to control the gel strength or to prevent premature gelling. Preferably, the concentration of sodium alginate employed to bind the meat or poultry and water ranges from 0.25% to 1.00%. The amount necessary is determined by the enzyme source and level of added water in the formulation.

The modified food starch is employed in this invention to bind added water and moisture released from the meat or poultry during the cooking process and to prevent moisture loss during freeze/thaw cycles. This moisture retention results in a product that is smooth in texture and juicy. The choice of modified food starch is dictated by the internal temperature of the cooked product and whether it will be marketed frozen. The modified starch may be corn, waxy maize, potato, wheat, rice or tapioca based. Preferably, the concentration of starch ranges from 0.5% to 3.0%. The amount is determined primarily by the level of added water in the formulation.

Seasonings, spices or flavorings may optionally be added to the formulation depending on the desired flavor profile. The term "flavor enhancer" is used herein to refer to seasonings, spices or flavorings.

The meat and marinade are blended together in a vacuum blender or tumbler. Product that will be formed using a Formax or like forming equipment must first be chilled to the appropriate temperature using carbon dioxide and then vacuum blended to prevent puffing during the cooking process. Product that will be stuffed into a casing or mold using a vacuum stuffer or similar equipment does not need to be chilled or vacuum processed.

Once the product is formed the following options exist. The formed product can be immediately frozen. A second option is to partially cook the product prior to freezing. The last option is to fully cook the product to an internal temperature of 160° F. to 165° F. before freezing. The later would be the most likely option for this type of product. Products may be glazed before or after freezing. The glaze may be as simple as an ice glaze (water only) and as complex as a blend of seasonings, flavorings, starches and/or gums. Freezing is defined to be an internal temperature of 0° F. to 10° F.

The present invention would also allow the fully cooked product to be chilled (28–40° F.) instead of frozen and marketed as such.

Product stuffed into a casing and not cooked may be cut into portions from a frozen state, while fully cooked product may be cut into portions from a chilled state.

The invention has applications to, but is not limited to the manufacture of the following products in pureed form: chicken, turkey, pork, beef and veal patties, hot dogs, ham, pork roast, roast beef, pastrami, corned beef, breakfast sausage, smoked sausage, bologna, salami, meat loaf, salisbury steak and meatballs.

EXAMPLES

Example 1—Pureed Chicken

This is an example of a pureed chicken patty made according to the present invention.

First, 16.5 pounds of boneless, skinless chicken breast, 16.0 pounds of skinless thigh meat and 7.5 pounds of skin were ground through a ⅛' plate with a 4 blade knife.

Next, 6.96 pounds of water were added to a mixing tank, and with agitator on high speed 0.025 pounds of methyl cellulose (Hercules, Benecel M043), 2.00 pounds of seasoning, 1.00 pound of modified food starch (Avebe, Perfectamyl AC) and 0.015 pounds of papain (Enzyme Development Corp. Liquipanol T-100) were added. Each ingredient was mixed until dissolved.

Then the ground chicken, skin and marinade mixture above were added to a paddle blender. The mixture was blended for approximately 5 minutes. Carbon dioxide snow was added to chill the mixture to 26–28° F. Once the product was chilled, it was vacuum blended for 3 minutes to remove excess carbon dioxide.

The resulting mixture was formed into a chicken breast fillet shape of approximately 3.10 ounces using a Formax F6 forming machine.

The formed product was cooked to an internal temperature of 160–165° F. using a combination of dry heat and steam. The cooked product was glazed with a teriyaki sauce and frozen to 0° F.

Example 2—Pureed Chicken

This is an example of a pureed chicken patty made according to the present invention.

First, 1.55 pounds of boneless, skinless chicken breast, 1.45 skinless thigh meat, and 0.75 pounds of skin were ground through a ⅛' plate with a 4 blade knife.

Next, 0.82 pounds of water were added to a mixing tank. With the agitator on high speed, 0.125 pounds Kelco, Lacticol F336 (sodium alginate blend), 0.20 pounds seasoning, 0.10 pounds modified food starch (Avebe, Perfectamyl AC) and 0.0015 pounds papain (Enzyme Development Corp. Liquipanol T-100) were added. Each ingredient was mixed until dissolved.

Then, the ground chicken, skin and marinade mixture were added to the paddle blender. The mixture was blended for approximately 2 minutes. Carbon dioxide snow was added to chill the mixture to 26–28° F.

The resulting mixture was formed into a chicken breast filet shape of approximately 3.10 ounces.

The formed product was cooked to an internal temperature of 160–165° F. using a combination of dry heat and steam. The cooked product was glazed with a teriyaki sauce and frozen to 0° F.

Example 3—Pureed Chicken

This is an example of a pureed chicken patty made according to the present invention.

First, 4.00 pounds of boneless, skinless chicken breast was ground through a ⅛' plate with a 4 blade knife.

Next, the ground chicken breast, 0.70 pounds of water, 0.10 pounds of modified food starch (Grain Processing B990), 0.20 pounds of seasoning and 0.0025 pounds of bromelain (Enzyme Development Corp. Enzeco M-150) were added to the blender. The mixture was blended for 30 seconds. Carbon dioxide snow was added to chill the mixture to 26–28° F.

The resulting mixture was formed into a chicken breast fillet shape of approximately 3.10 ounces.

The formed product was cooked to an internal temperature of 160–165° F. using a combination of dry heat and steam.

Example 4—Pureed Turkey

This is an example of a pureed turkey patty made according to the present invention.

First, 0.60 pounds of boneless, skinless turkey thigh meat was ground through a ⅛' plate with a 4 blade knife.

Next, the ground turkey thigh, 0.1044 pounds of water, 0.015 pounds of modified food starch (Grain Processing Corp. B990), 0.0004 pounds of methyl cellulose (Hercules, Benecel M043), 0.03 pounds seasoning and 0.0002 pounds of papain (Enzyme Development Corp. Liquipanol T100) were added to a food processor. The mixture was blended for 15 seconds.

The resulting mixture was formed into a chicken breast fillet shape of approximately 3.10 ounces.

The formed product was cooked to an internal temperature of 160–165° F. using a combination of dry heat and steam.

Example 5—Pureed Pork

This is an example of a pureed pork patty made according to the present invention.

First, 0.60 pounds of boneless pork loin was ground through a ⅛' plate with a 4 blade knife.

Next, the ground pork, 0.1044 pounds of water, 0.015 pounds of modified food starch (Grain Processing Corp. B990), 0.0004 pounds of methyl cellulose (Hercules, Benecel M043), 0.03 pounds seasoning and 0.0002 pounds of papain (Enzyme Development Corp. Liquipanol T-100) were added to a food processor. The mixture was blended for 15 seconds.

The resulting mixture was formed into a chicken breast fillet shape of approximately 3.10 ounces.

The formed product was cooked to an internal temperature of 160–165° F. using a combination of dry heat and steam.

Example 6—Pureed Beef

This is an example of a pureed beef patty made according to the present invention.

First, 0.8390 pounds of boneless beef round was ground through a ⅛' plate with a 4 blade knife.

Next, the ground beef, 0.1400 pounds of water, 0.02 pounds of modified food starch (Gain Processing Corp. B990), 0.0005 pounds of methyl cellulose (Hercules, Benecel M043), 0.03 pounds seasoning and 0.0005 pounds of papain (Enzyme Development Corp. Liquipanol T-100) were added to a food processor. The mixture was blended for 15 seconds.

The resulting mixture was formed into a round patty shape of approximately 4.00 ounces.

The formed product was cooked to an internal temperature of 160–165° F. using a combination of dry heat and steam.

The present invention has been described with reference to certain preferred and alternative embodiments which are intended to be exemplary only and not limiting to the full scope of the present invention as set forth in the appended claims.

What is claimed is:

1. A method for producing a meat product, comprising the steps of:
   (a) blending comminuted raw meat with a proteolytic enzyme and a binder; and
   (b) forming the resulting, uncooked raw meat/proteolytic enzyme/binder mixture into an uncooked, shaped product having a shape of a patty or a whole muscle product,
   wherein the proteolytic enzyme is blended with the raw meat in step (a) in an amount effective such that, upon at least partially cooking the uncooked, shaped product subsequent to step (b), the proteolytic enzyme will digest the meat to a degree sufficient to impart to the shaped product a texture substantially corresponding to that of a pureed product.

2. The method of claim 1 wherein the proteolytic enzyme and the binder are in the form of a marinade.

3. The method of claim 2 wherein the marinade further comprises a liquid.

4. The method of claim 3 wherein the liquid is water.

5. The method of claim 3 wherein the liquid is a broth.

6. The method of claim 2 wherein the marinade further comprises a flavor enhancer.

7. The method of claim 1 wherein the proteolytic enzyme on a weight basis comprises from about 0.01% to about 0.10% of the mixture.

8. The method of claim 7 wherein the proteolytic enzyme is papain.

9. The method of claim 7 wherein the proteolytic enzyme is bromelin.

10. The method of claim 7 wherein the proteolytic enzyme is ficin.

11. The method of claim 1 wherein the binder is a heat gelling gum.

12. The method of claim 11 wherein the heat gelling gum is selected from the group comprising methylcellulose, hydroxypropylcellulose, and methylhydroxypropylcellulose.

13. The method of claim 12 wherein the heat gelling gum is on a weight basis from about 0.01% to about 0.15% of the mixture.

14. The method of claim 1 wherein the binder is sodium alginate.

15. The method of claim 14 wherein the sodium alginate is on a weight basis from about 0.25% to about 1.00% of the mixture and wherein an amount of a calcium source effective to form a gel is also blended in step (a) with the raw meat and the sodium alginate.

16. The method of claim 15 wherein the mixture further comprises an amount of a calcium sequestrant effective for at least preventing premature gelling of the mixture.

17. The method of claim 1 wherein the binder is a starch derived from the group comprising corn, waxy maize, potato, wheat, rice and tapioca.

18. The method of claim 17 wherein the starch is on a weight basis from about 0.5% to about 3.0% of the mixture.

19. The method of claim 1 further comprising the step subsequent to step (b) of freezing the uncooked shaped product.

20. The method of claim 1 wherein the uncooked shaped product subsequent to step (b) is partially cooked and then frozen.

21. The method of claim 20 wherein the shaped product after being partially cooked and prior to being frozen is glazed.

22. The method of claim 20 wherein the shaped product after being partially cooked and frozen is glazed.

23. The method of claim 1 wherein the uncooked shaped product subsequent to step (b) is fully cooked and then frozen.

24. The method of claim 23 wherein the shaped product after being fully cooked and prior to being frozen is glazed.

25. The method of claim 23 wherein the shaped product after being fully cooked and frozen is glazed.

26. The method of claim 1 wherein the uncooked shaped product subsequent to step (b) is fully cooked and then chilled.

27. The method of claim 1 wherein the shape is that of a poultry breast filet.

* * * * *